United States Patent [19]
Ralph

[11] Patent Number: 4,468,268
[45] Date of Patent: Aug. 28, 1984

[54] METHOD OF SPLICING MOTION PICTURE FILM NEGATIVES

[76] Inventor: Brian Ralph, 320 S. Beachwood Dr., Burbank, Calif. 91506

[21] Appl. No.: 448,423

[22] Filed: Dec. 10, 1982

[51] Int. Cl.³ .............................................. B31F 5/00
[52] U.S. Cl. .................................. 156/159; 156/153; 156/304.5; 156/505; 156/509
[58] Field of Search ............... 156/153, 505, 159, 509, 156/304.5, 257, 268

[56] References Cited

U.S. PATENT DOCUMENTS

| | | | |
|---|---|---|---|
| 1,310,215 | 7/1919 | Schneider | 156/505 |
| 2,318,287 | 5/1943 | Brolin | 156/159 |
| 2,794,489 | 6/1957 | Drummond | 156/505 |
| 2,925,850 | 2/1960 | Kral | 156/509 |
| 3,342,656 | 9/1967 | Papageorges | 156/304.5 |
| 3,567,555 | 3/1971 | Stenzenberger et al. | 156/509 |
| 4,319,938 | 3/1982 | Vives | 156/159 |
| 4,368,096 | 1/1983 | Kobayashi | 156/159 |

*Primary Examiner*—Jerome W. Massie
*Attorney, Agent, or Firm*—Thomas I. Rozsa

[57] ABSTRACT

An improved method of splicing film such as original motion picture film negative which provides a quick, efficient and inexpensive way to splice the film in such a fashion that no frames of film footage are lost as a result of the splice, the splice is permanent and a new splice can be made over the old splice if necessary.

8 Claims, 8 Drawing Figures

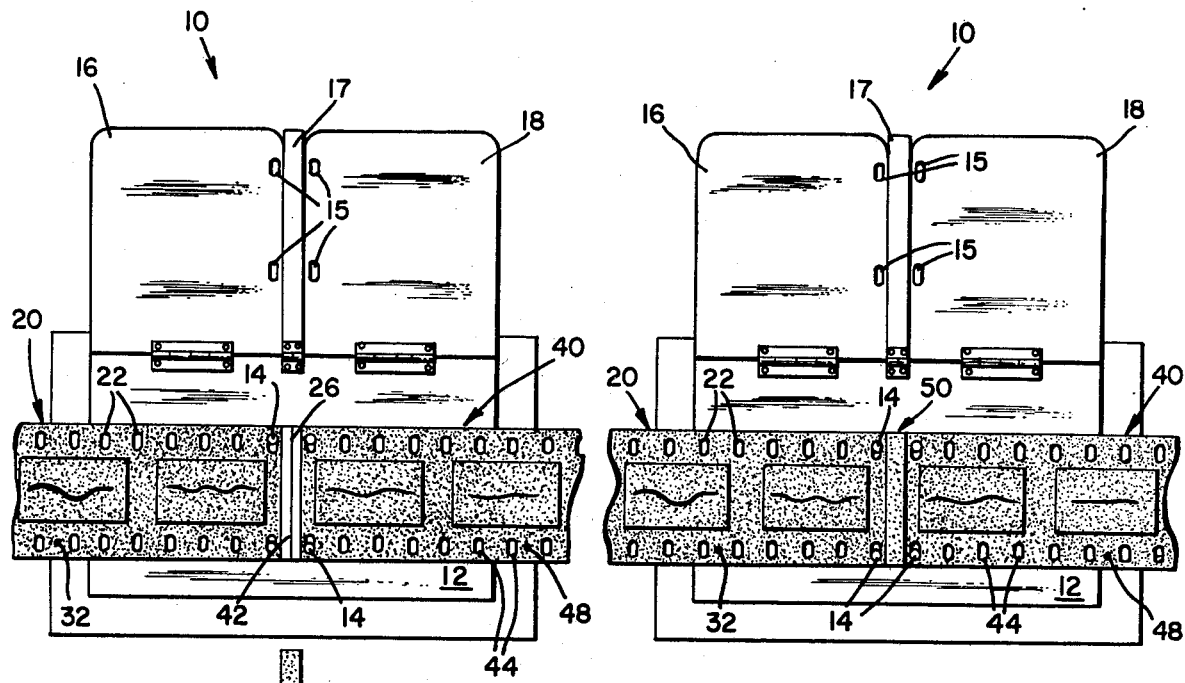
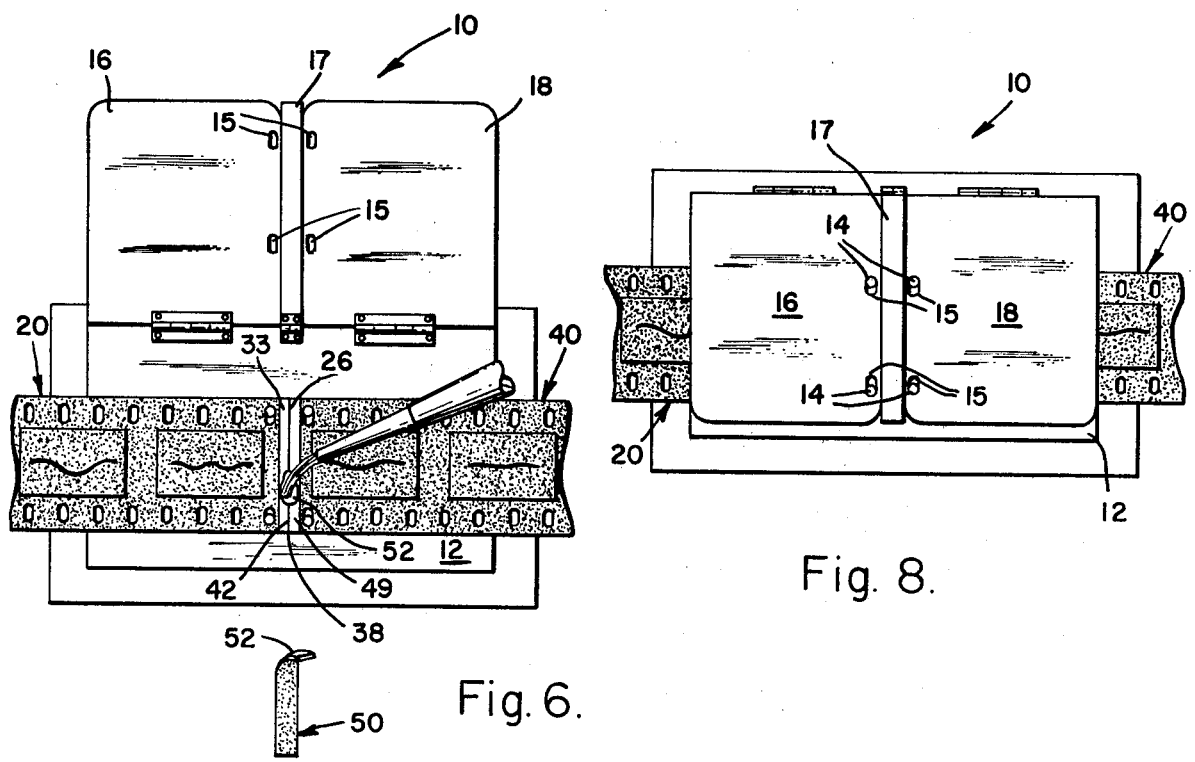

METHOD OF SPLICING MOTION PICTURE FILM NEGATIVES

BACKGROUND OF THE INVENTION

1. Field of the Invention

The present invention relates to an improved method of splicing film such as original motion picture film negatives. The improved method provides a quick and efficient way to splice the original motion picture film negative in such a fashion that no frames of film footage are lost as a result of the splice. The present invention also provides an inexpensive as well as efficient process for splicing film negative with no loss of film footage.

2. Background of the Invention

After the film for a motion picture of video tape has been shot, the film must then be edited in order to create the final product. Editing can improve almost any film, no matter how carefully it has been shot. The film maker examines the work scene by scene, or even frame by frame, looking for places to add or cut material. A poorly exposed piece of film can be eliminated. Undesired parts of a film can be eliminated with an editing set. The operator runs the film through a viewer to see the enlarged film on a screen. He marks the unwanted parts and removes the film from the viewer. Then he uses a splicer to cut the parts from the film. He then uses a special tape to join the ends.

Splicing is the method joining two lengths of cine film or magnetic tape during editing or to repair breaks in the film. A good splice should be at least as strong as the original material and it should run through the equipment without any noticeable hitch. A splice can be made by hand or by using a more or less automatic splicing jig. The splicing jig makes a quicker and more accurate job. When joining lengths of film, it is not enough to make a strong and accurately lined up joint; the spacing of the sprocket holes must be maintained from one side of the splice to the other.

After a motion picture film is shot in the camera, a positive print is made from the original negative. The director or producer work from the positive print and make the decision as to what frames of film should be removed and also decide in what sequence the frames of film should be run. Specific instructions are then provided to the negative cutters who must then cut the original motion picture film negative to conform to the desires of the film director or producer. Since this is the original picture negative, once a frame is lost it is gone forever. In conventional negative cutting techniques, the original picture negative is cut down the center of a frame and then adjoining ends of film are overlapped when the splice is made. As a result, at least two frames of film must be lost during the negative cutting and splicing process at the location of each splice.

In general, there are presently three basic types of splicing techniques which are known for splicing original picture negatives. The most common is the overlap-cement splice. The usual way is to cut the ends of the film negative square and join them by lapping one over the other. This type of splice requires that the end of one film piece overlap the end of another film piece. In order to splice or join these pieces together, the emulsion must be scraped off along the overlapping area of one piece, the surfaces softened with cement, and the two pieces of film clamped firmly together. The two pieces spliced in this manner are actually welded together—the film cement causes one film base to weld into the other film base. A major drawback to using this type of splice is that at least two frames and sometimes several frames of film must be lost during this splicing process because of the overlap. If the splice must be made at a critical portion of the film and it would cost a lot of money to reshoot this scene, the loss of these frames could create a severe problem.

A second method of splicing film negative is the Pressure-Sensitive Perforated Tape method. This type of splice repairs or joins all types of film by mechanically applying a clear mylar tape, coated on one side with a pressure-sensitive adhesive. This tape is also perforated to match the film to be spliced. This method also has several disadvantages. These types of mylar tapes are more expensive per splice than the overlap cement type. Also, the frame-line cut prohibits later resplicing by overlap cement. In addition, this type of splice should not be used for film to be printed because the tape will shown on the screen. Finally, this type of splice is usually only adequate as a temporary splice and therefore is not truly appropriate for the permanent type of splice required for original motion picture film negatives.

A third method is the Guillotine-Tape Splice. The guillotine splicer uses mylar tape to make butt-type straight or diagonal splices. In this process, the film negative is laid on the register pins on the recessed splicing block, then the mylar tape is positioned at right angles to the film, and then the tape is pulled out across the open splice. With two quick strokes of the guillotine handle, the applied tape is perforated and cut to conform to the film. A major disadvantage of this method is that a good sprocket hole is not always achieved by this cutting process and this causes the film to "lose the loop" in the projector. Therefore, this splicing method should not be used for film to be printed and therefore not appropriate for quality original picture negatives. Once again, this type of splice is primarily used as a temporary splice and is not adequate for the permanent type of splice required for original motion picture film negative.

Therefore, the prior art does not disclose a quick, efficient and inexpensive method of splicing original motion picture film negatives in such a fashion that no frames of film footage are lost as a result of the splice and which will permit resplicing of the area if necessary. Further, only the overlap method known in the prior art is truly effective as a permanent splice which is required for original motion picture film negatives.

SUMMARY OF THE PRESENT INVENTION

The present invention relates to an improved method of splicing motion picture film negatives which provides a quick, efficient and inexpensive way to splice the film negative in such a fashion that no frames of film footage are lost as a result of the splice and a new splice can be made over the old splice if necessary.

It has been discovered, according to the present invention, that if a cut in the film negative is made between the picture frames and the support strip used to splice the two pieces of film negative together is set over the two cut edges between the picture frames in the film, then no amount of film footage will be lost as a result of the splice.

It has further been discovered, according to the present invention, that if a small amount of the base is removed from the same side of the two strips of film negative to be spliced together or if the emulsion is removed from the same side of two strips of film negative to be spliced together and then the film cement is spread over the scraped areas and permitted to run between the butted ends of the two strips of film, then when the film support strip is placed over the cement coated scraped sides, an extremely strong support and splice will be achieved with no loss of film footage. It is therefore not necessary to scrape the emulsion off the side of one strip of film and scrape the base off the other side of the second strip of film and then overlap them and lose picture frames of film in order to achieve a strong splice, as has conventionally been done in the prior art.

It is therefore an object of the present invention to provide an improved method of splicing original motion picture film negatives which provides a quick, efficient, and inexpensive way to permanently splice film negative in such a fashion that no frames of film footage are lost as a result of the splice and a new splice can be made over the old splice if necessary.

Further novel features and other objects of the present invention will become apparent from the following detailed description, discussion and appended claims, taken in conjunction with the drawings.

DRAWING SUMMARY

Referring particularly to the drawings for the purpose of illustration only and not limitation there is illustrated:

FIG. 5 is a top plan view of a splicer with the first and the second strip of original motion picture film negative placed in the splicer such that their cut ends abut after each strip has had a portion of the base or the emulsion scraped from its surface on the same side, with a support strip placed adjacent the splicer.

Figure 1:
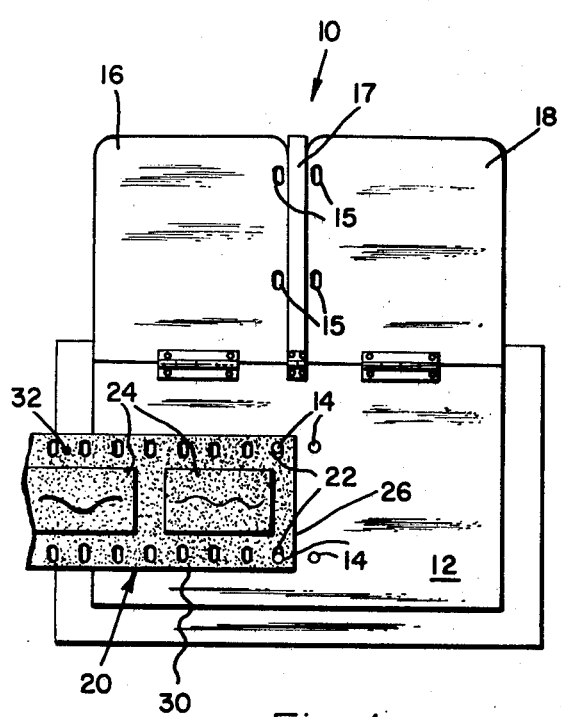
FIG. 1 is a top plan view of a splicer with a first strip of original motion picture negative placed into the splicer after it has been cut between picture frames.

FIG. 6 is a top plan view of a splicer with the first and the second strip of original motion picture film negative placed in the splicer such that their cut ends abut after each strip has had a portion of the base or the emulsion scraped from its surface on the same side, and cement has been placed on the scraped portion of each strip of film negative and optionally on the support strip adjacent the splicer.

FIG. 7 is a top plan view of a splicer with the first and the second strip of original motion picture film negative placed in the splicer such that their cut ends abut after each strip has had a portion of the base or the emulsion scraped from its surface on the same side, and after cement has been placed on the scraped ends and optionally on the support strip and the support strip has been placed over the cement coated scraped portions of the film negative.

FIG. 8 is a top plan view of a splicer with all of its flaps lowered to seal a splice after the support strip has been placed over the cement coated scraped portions of the two strips of original motion picture film negative.

DETAILED DESCRIPTION OF THE PREFERRED EMBODIMENT

The drawings of the invention illustrate the use of a particular type of splicer to achieve the improved method of splicing of the present invention; however, the present invention can be utilized with any type of splicing apparatus and is not limited to the specific apparatus shown in the accompanying drawings. It is emphasized that the apparatus disclosed in the drawings is used solely to illustrate the improved method of splicing original motion picture film negative.

Referring to FIG. 1, the central film support portion of a conventional splicer is shown at 10. The splicer 10 contains a base 12 which has a multiplicity of pins 14 protruding upwardly from the base 12 and set in two parallel rows. The distance between the two rows of pins and the longitudinal distance between corresponding pins in each row are set to correspond to the sprocket holes in original motion picture film negatives. The splicer 10 also contains a first flap 16, a second flap 18, and an intermediate third flap 17, each of which is shown in the opened position in FIG. 1. The first and second flap contain a multiplicity of openings 15 to receive the respective pins 14 when the flaps are closed.

FIG. 1 is a top plan view of a splicer 10 with a first strip of original motion picture film negative 20 placed into the splicer 10 such that it is on the splicer base 12. The first strip of original motion picture film negative 20 is set so that its first row of sprocket holes 22 correspond to and fit over the first two pins 14. The first strip of original motion picture film negative 20 contains a multiplicity of frames of pictures 24 placed longitudinally along the film negative 20. The first strip of film negative 20 has been cut transversely and approximately perpendicular to the longitudinal axis of the film negative 20 such that the cut is made between two frames of pictures 24 and not within a frame 24. The first cut end 26 is placed such that it is on the interior portion of splicer 10 and extends beyond the interior border of first flap 16.

The first strip of film 20 contains 2 sides, a base side and an emulsion side. By way of example, a conventional piece of motion picture film negative can be approximately 6/1000ths of an inch thick. The emulsion side can be approximately 1/1000th of an inch thick while the base side can be approximately 5/1000ths of an inch thick. The method of the present invention permits the support strip of the splice to be placed on either the emulsion side or the base side of the film. The following description is made with the assumption that the splice shall be made on the base side however, the same procedure can be applied for the splice to be made on the emulsion side. The only requirement is that the same side can be used for the two adjoining strips of film negative to be spliced together. The first strip of film negative 20 is placed into the splicer 10 such that the emulsion side 30 is face down and rests on the base of the splicer 12 while the base side of the film negative 32 is face up, as shown in FIG. 1.

Figure 2:
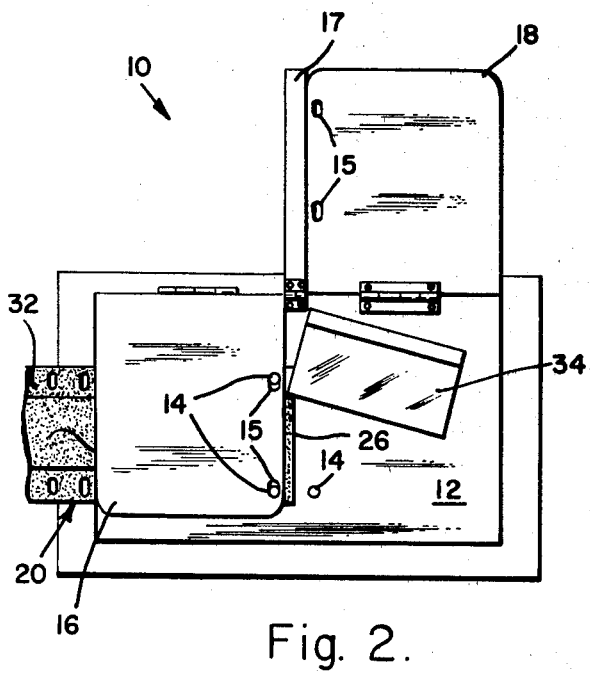
FIG. 2 is a top plan view of a splicer with a first flap lowered to hold the first strip of original motion picture film negative and showing a portion of the base level or the emulsion being scraped from one side of the film negative.

FIG. 2 is a top plan view of a splicer 10 with the first flap 16 lowered to hold the first strip of film negative 20, and permitting a portion of the film negative 20 adjacent its cut end 26 to remain exposed. A small portion of the base of the film negative 32 adjacent its cut end 26 is cleared and scraped off by a scraping tool such as a razor or blade 34. By way of example, 1/1000th of an inch of thickness of base material is scraped off the film negative. The portion of the thickness of material removed begins adjacent the cut edge 26 and can extend approximately as far as the closest border of the nearest frame of picture 24 on the film 20 but preferably a distance of film negative remains between the border of the first picture frame and the area of base material which has a portion scraped off. By way of example a longitudinal distance of approximately 20/1000ths of an inch can be scraped off the base side for the entire width of the film negative.

Figure 3:
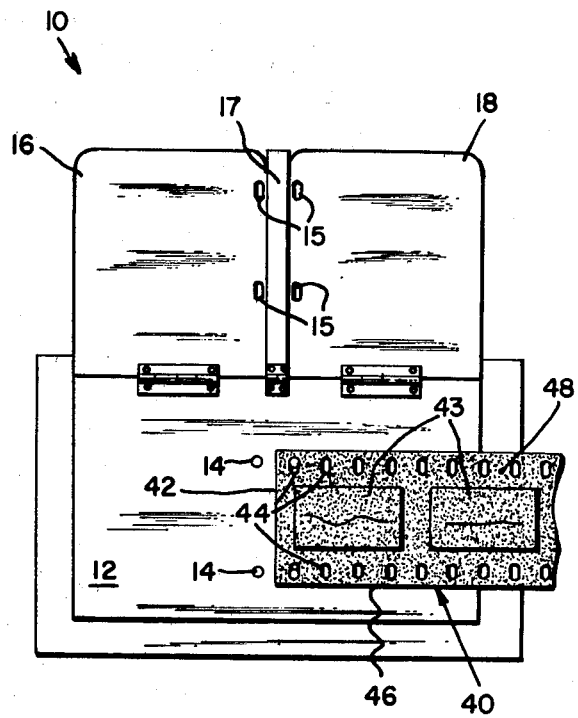
FIG. 3 is a top plan view of a splicer with a second strip of original motion picture film negative placed into the splicer after it has been cut between picture frames.

The first strip of film negative can then be removed, and a second strip of film negative 40 to be spliced to it is then inserted into the splicer as shown in FIG. 3. FIG. 3 is a top plan view of a splicer 10 after a second strip of original motion picture film negative 40 has been placed into it. It is set into the splicer in a fashion similar to the first strip of original motion picture film negative but its cut end is facing in the opposite direction. The second strip of film negative 40 is also cut transversely between frames of pictures 43. Once again the cut is approximately perpendicular to the longitudinal axis of the film. The second strip of film negative 40 is set so that its sprocket holes 44 correspond to and fit over the next two pins 14 as shown in FIG. 3. The cut end 42 is placed such that it is on the interior portion of splicer 10, but facing in the direction opposite to that of the first strip of film negative 20. Assuming the thicknesses of the emulsion side 46 and base side 48 of the second strip of film negative 40 are approximately the same as the first strip of film negative 20, the emulsion side 46 is once again placed face down and the base side 48 is therefore face up.

Figure 4:
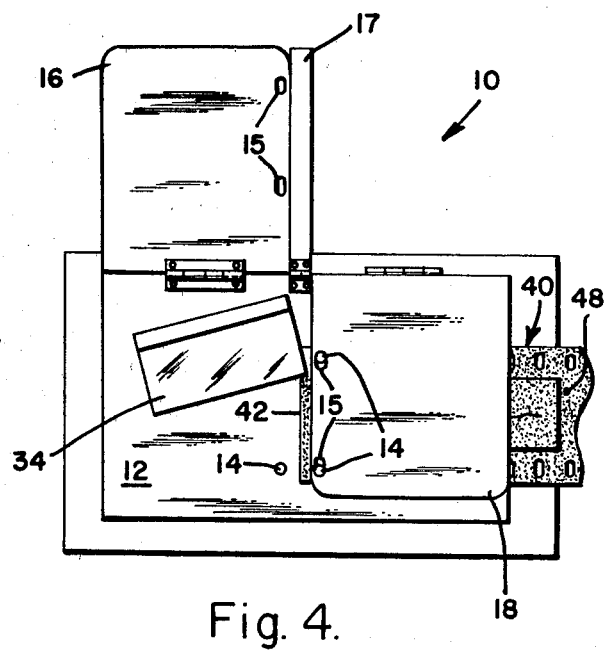
FIG. 4 is a top plan view of a splicer with a second flap lowered to hold the second strip of original motion picture film negative and showing a portion of the base level or the emulsion being scraped from one side of the film.

FIG. 4 is a top plan view of a splicer 10 with the second flap 18 lowered to hold the second strip of film 40, and permitting a portion of the film 40 adjacent its cut end 42 to remain exposed. A similar amount of the base of the film negative 48 is then cleared and scraped off by tool 34. As in the previous case, approximately 1/1000th of an inch of thickness of base material is scraped off the film. Once again, the portion of the thickness of material removed begins adjacent the cut edge 42 and extends for a distance along the film 40, which by way of example can be approximately 20/1000's of an inch. Once again, the material is removed from the entire width of the film 40 for this longitudinal distance.

The second strip of film negative 40 can then be removed. As shown in FIG. 5, the first strip of film negative 20 and the second strip of film negative 40 are then placed in the splicer 10 such that their cut ends, 26 and 42 respectively, approximately abut each other with each scraped portion of base facing upwardly. Also shown in FIG. 5 is a conventional piece of cellulose support strip 50, which is a standard item used in splicing motion picture film negative and is usually the same width as the motion picture film negative. By way of example, the support strip 50 can be 5/1000th of an inch thick.

The next step is to apply standard film cement 52 to the scraped area of the base of each strip of film to be spliced. There are various proprietary film cements available. In all of them the action is the same; the cement softens the film base as soon as it is applied, and a few seconds later it is absorbed by the base. The splice must then be made while the base is still in the soft condition.

FIG. 6 shows the film cement 52 applied to the scraped portion 33 of the base side 32 of first strip of film negative 20 and the cement applied to the scraped portion 49 of the base side 48 of second strip of film negative 40. It is possible that some cement might flow into the gap 38 between cut ends 26 and 42 of the two strips of film negative, but this is not essential. It is preferable that there be no gap 38 but due to physical limitations, there will probably be a minute gap 38 between the two abutting strips of film negative. The film cement 52 can also be applied to one side of the support strip 50 as shown in FIG. 6, but this is optional.

The next step is to place the support strip 50 directly over the cement coated scraped sections 33 and 49 and the two strips of film negative to be spliced, as shown in FIG. 7. The width of the support strip 50 is designed so that it covers only the scraped areas 33 and 49 and possibly slightly beyond, but does not cover any frame of picture 24 or 42 of either strip of film.

The final step involves flipping flaps 16, 17 and 18 down so that the pressure is applied between the support strip 50 and the two strips of film 20 and 40 to be spliced. The film cement 52 is thereby allowed to harden and form a secure bond. Any film cement 52 which runs into the minute gap 38 between the two strips of film will also serve to increase the strength of the bond.

In an alternative method, flaps 16 and 18 are flipped down over the film negatives 20 and 40 respectively before the film cement 52 is applied to the adjoining scraped areas of the film strips to be spliced. This will assure that the film cement 52 will not run onto any adjoining frames of pictures 24 and 43 respectively. Then after the film cement 52 is applied and support strip 50 is in place, third flap 17 is lowered so that pressure is applied between the support strip 50 and the two strips of film 20 and 40 to be spliced.

The above method is applicable to all types of motion picture film. By way of example, if the film is 35 mm motion picture film, the combined length of the areas where the base material was removed is approximately 40/1000ths of an inch and the corresponding length of the support strip 50 is approximately 40/1000ths of an inch. In some applications for 35 mm motion picture film, it is preferable that the combined length of the areas where the base material is removed should be approximately 50/1000ths of an inch and the corresponding length of the support strip 50 is then approximately 50/1000ths of an inch. Therefore, a length of approximately 25/1000ths of an inch of material from each strip to be spliced is removed. If the film is 65 mm motion picture film, the combined length of the areas where base material was removed is approximately 50/1000ths of an inch and the corresponding length of the support strip 50 is approximately 50/1000ths of an inch.

The above method has been described with the splice applied to the base side of the film. As previously mentioned, the above steps can also be used when applied to the emulsion side of the film. Instead of removing approximately 1/1000th of an inch of base material, the entire thickness of emulsion which by way of example can be 1/1000th of an inch is removed from the side of the film negative to be spliced. This amount is removed from each of the two pieces of film negative to be spliced. Once again, the material is removed from the entire width of the film for the length which extends from the cut end to a distance which does not reach the border of the first picture frame. Once again, by way of example, this distance can be 20/1000ths of an inch for 35 mm film and 25/1000ths of an inch for 65 mm film.

Once again, it is emphasized that the apparatus utilized for descriptive purposes in the drawings is only intended to show one apparatus which can provide the splicing means for the improved present method invention, and is in no way intended to limit the present invention to the apparatus used for illustrative purposes.

In general, therefore, the present invention comprises a method of splicing motion picture film negative which involves making a transverse cut which is approximately perpendicular to the longitudinal axis of the film negative through the entire width of the first length of film negative and at a location between frames of pictures on the first length of film negative and then removing a portion of the thickness on one side of the first length of film negative for the entire width of the film negative and beginning adjacent its cut edge and extending for a distance into the film negative but not as far as the closest border of the nearest frame of picture on the film negative. The method further involves making a transverse cut which is approximately perpendicular to the longitudinal axis of the film negative through the entire width of the second length of film negative and at a location between frames of pictures on the second length of film negative, and then removing a portion of the thickness on one side of the second length of film negative for the entire width of the film negative and beginning adjacent its cut edge and extending for a distance into the film negative but not as far as the closest border of the nearest frame of picture on the film negative. The material which is removed is located on the same side of the first length of film negative and the second length of film negative with approximately equal thicknesses being removed from each length of film negative. The first and second lengths of film negative are placed adjacent each other such that their respective cut edges abut one another. Then adhesive is applied to the first length of film negative and to the second length of film negative at the location where material was removed from each length of film negative. A third length of film such as the support strip is then placed onto the first and second lengths of film negative at the location of the areas where material was removed, and then pressure is applied to the two lengths of film negative and the support strip until they are bonded together. Ideally, the support strip and the film negatives should be the same width, however, the support strip could be cut to the same width after the splicing is completed. While the above method has been described primarily for original motion picture film negative, it is equally applicable to tape.

The present invention therefore eliminates the wasteful process of cutting into exposed frames of original motion picture film negative and overlapping the side of one strip of film negative to the opposite side of the second strip of film negative to form the splice. Here, the same side of each film negative is used to form the splice and the cut is made so that no frames of film negative footage are lost. The present invention method is quick, efficient, and inexpensive. The nature of the splice is such that the area can be respliced if this is necessary by simply cutting along the approximate position of the adjoining edges of the two lengths of film negative and then resplicing the two lengths of film negative. The method described provides a permanent splice which can be utilized in the original motion picture film negative from which copies can be made.

The method described above is applicable for splicing two different pieces of film together or for splicing together a piece of film which has broken at a particular location. The splicing of two separate pieces of film together is most commonly used in editing films, where portions of film are removed or exposures to be used in sequence are shot at different times and must be then spliced together to form a coherent story. In the editing situation, the two separate pieces of film are cut transversely as described above at a location between film pictures, so as not to lose any film footage. The cuts are preferably perpendicular to the longitudinal plane of the film so that the two abutting ends are parallel. In the situation where a piece of film breaks and must be spliced together, if the break is at a location between two film frames, then the cut can be made to even out the split ends so they will be parallel without cutting into a film frame picture, and then the splicing technique as described above is employed. If the break occurs in the middle of a film picture frame, the cuts are made on each half between the broken frame and the next adjacent frame. In this way, only the one frame which was lost anyway since the break occurred there, is lost, and no additional frames of film are lost.

While the above method has been described for film, its principals are equally applicable to tape.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the method shown is intended only for illustration and for disclosure of an operative embodiment, not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of the patent monopoly to be granted.

What is claimed is:

1. A method of splicing two lengths of motion picture film negative together comprising:
   a. making a transverse cut which is approximately perpendicular to the longitudinal axis of the motion picture film negative through the entire width of the first length of motion picture film negative and at a location between frames of pictures on the first length of motion picture film negative;
   b. removing a portion of thickness of base material on the base side of the first length of motion picture film negative beginning adjacent its cut edge and extending for a distance into the film negative but not as far as the closest border of the nearest frame of picture on the motion picture film negative;
   c. making a transverse cut which is approximately perpendicular to the longitudinal axis of the motion picture film negative through the entire width of the second length of motion picture film negative and at a location between frames of pictures on the second length of motion picture film negative;

d. removing a portion of thickness of the base material on the base side of the second length of motion picture film negative beginning adjacent its cut edge and extending for a distance into the film negative but not as far as the closest border of the nearest frame of picture on the motion picture film negative;

e. the thickness of base material which is removed from said first length of motion picture film negative and from said second length of motion picture film negative being approximately equal;

f. placing said first length of motion picture film negative and said second length of motion picture film negative adjacent each other such that their respective cut lengths abut one another;

g. applying an adhesive to the first length of motion picture film negative and to the second length of motion picture film negative at the location where base material was removed from each length of motion picture film negative;

h. placing a third length of film onto said first and second lengths of motion picture film negative at the location of the areas where material was removed; and i. applying pressure to the adjoining areas of the two lengths of motion picture film negative and the third length of film until they are bonded together.

2. The invention as defined in claim 1 wherein the width of the first length of motion picture film negative, the second length of motion picture film negative, and the third length of film are approximately equal.

3. The invention as defined in claim 1 wherein the width of said third length of film is approximately equal to the combined length of the area of the base material which was removed from said first and second lengths of motion picture film negative.

4. The invention as defined in claim 1, wherein said third length of film is a motion picture support strip.

5. The invention as defined in claim 1 wherein the thickness of base material removed from each length of motion picture film is approximately 1/1000th of an inch.

6. The invention as defined in claim 1 wherein said motion picture film is 35 mm film, the combined length of the areas where base material was removed is approximately 40/1000ths of an inch and the corresponding width of the third length of film is approximately 40/1000th of an inch.

7. The invention as defined in claim 1 wherein said motion picture film is 65 mm film, the combined length of the areas where base material was removed is approximately 50/1000ths of an inch and the corresponding width of the third length of film is approximately 50/1000th of an inch.

8. The invention as defined in claim 1 wherein said original motion picture film negative is 35 mm film, the combined length of the areas where base material was removed is approximately 50/1000ths of an inch and the corresponding length of the third length of film is approximately 50/1000th of an inch.

* * * * *